United States Patent
Kagan (10) Patent No.: US 9,553,844 B2
(45) Date of Patent: Jan. 24, 2017

(54) DNS APPLICATION SERVER

(75) Inventor: Martin Kagan, Portland, OR (US)

(73) Assignee: Cedexis, Inc., Portland, OR (US)

( * ) Notice: Subject to any disclaimer, the term of this patent is extended or adjusted under 35 U.S.C. 154(b) by 154 days.

(21) Appl. No.: 13/502,100

(22) PCT Filed: Oct. 7, 2010

(86) PCT No.: PCT/US2010/051720
§ 371 (c)(1),
(2), (4) Date: May 30, 2012

(87) PCT Pub. No.: WO2011/046790
PCT Pub. Date: Apr. 21, 2011

(65) Prior Publication Data
US 2012/0246290 A1    Sep. 27, 2012

Related U.S. Application Data (60) Provisional application No. 61/258,042, filed on Nov. 4, 2009, provisional application No. 61/251,136, filed on Oct. 13, 2009.

(51) Int. Cl.
*H04L 29/12* (2006.01)
*H04L 12/14* (2006.01)

(52) U.S. Cl.
CPC ......... *H04L 61/305* (2013.01); *H04L 61/1511* (2013.01); *H04L 12/1485* (2013.01)

(58) Field of Classification Search
CPC .................................................. H04L 61/305
USPC .... 709/220, 223, 226, 230, 232, 245; 707/3, 707/102; 370/255, 475
See application file for complete search history.

(56) References Cited

U.S. PATENT DOCUMENTS

| | | | |
|---|---|---|---|
| 6,006,260 | A | 12/1999 | Barrick, Jr. et al. |
| 6,446,121 | B1 | 9/2002 | Shah et al. |
| 6,996,616 | B1 | 2/2006 | Leighton et al. |
| 7,003,555 | B1 | 2/2006 | Jungck |
| 7,155,723 | B2 | 12/2006 | Swildens et al. |
| 7,289,519 | B1 * | 10/2007 | Liskov .............. H04L 29/12066 370/230 |
| 7,574,499 | B1 * | 8/2009 | Swildens et al. ............. 709/223 |
| 7,970,820 | B1 * | 6/2011 | Sivasubramanian ... H04L 67/20 709/203 |
| 9,106,701 | B2 * | 8/2015 | Richardson ......... H04L 61/1511 |
| 2001/0049741 | A1 * | 12/2001 | Skene et al. .................. 709/232 |
| 2002/0052942 | A1 * | 5/2002 | Swildens et al. ............. 709/223 |

(Continued)

FOREIGN PATENT DOCUMENTS

| | | |
|---|---|---|
| WO | 00-14940 A1 | 3/2000 |
| WO | 2011/056796 A1 | 5/2011 |

OTHER PUBLICATIONS

Supplemental European Search Report, May 10, 2013, for related app EP 10 823 851, 5 pp.

(Continued)

*Primary Examiner* — Jerry Dennison
(74) *Attorney, Agent, or Firm* — Klarquist Sparkman, LLP (57) ABSTRACT

A method for providing access to an Internet resource includes receiving a DNS query including a hostname to be resolved, receiving status data, invoking a code by a name indicated by the hostname, conveying the status data to the code, receiving from the code a selection of an infrastructure, and generating a DNS response directing a resolution to the infrastructure.

22 Claims, 3 Drawing Sheets

(56) References Cited

U.S. PATENT DOCUMENTS

| | | | |
|---|---|---|---|
| 2002/0078233 A1* | 6/2002 | Biliris | H04L 29/06 709/238 |
| 2003/0229682 A1* | 12/2003 | Day | H04L 29/06 709/219 |
| 2004/0073691 A1* | 4/2004 | Sun | G06F 17/30876 709/230 |
| 2004/0215707 A1 | 10/2004 | Fujita et al. | |
| 2005/0091378 A1 | 4/2005 | Nonnenmacher | |
| 2006/0075139 A1* | 4/2006 | Jungck | 709/245 |
| 2006/0112176 A1* | 5/2006 | Liu et al. | 709/223 |
| 2007/0005689 A1* | 1/2007 | Leighton et al. | 709/203 |
| 2007/0073846 A1* | 3/2007 | Reisman | G06F 8/65 709/219 |
| 2007/0214283 A1 | 9/2007 | Metke et al. | |
| 2008/0235400 A1* | 9/2008 | Slocombe | H04L 29/06 709/245 |
| 2009/0083413 A1 | 3/2009 | Levow et al. | |
| 2009/0210528 A1 | 8/2009 | Swildens et al. | |
| 2009/0327489 A1* | 12/2009 | Swildens | G06F 9/505 709/224 |
| 2009/0327517 A1* | 12/2009 | Sivasubramanian et al. | 709/238 |
| 2010/0088405 A1* | 4/2010 | Huang | H04L 41/12 709/224 |
| 2010/0125673 A1* | 5/2010 | Richardson et al. | 709/239 |
| 2010/0161787 A1 | 6/2010 | Jones | |
| 2011/0067023 A1* | 3/2011 | Chiyo | H04N 1/00222 717/177 |
| 2011/0078327 A1* | 3/2011 | Li | H04L 29/12066 709/238 |
| 2011/0137973 A1* | 6/2011 | Wei | H04L 67/1008 709/202 |
| 2011/0295983 A1* | 12/2011 | Medved | H04L 45/00 709/220 |
| 2011/0296053 A1* | 12/2011 | Medved | H04L 67/104 709/241 |
| 2013/0013764 A1* | 1/2013 | Li | H04L 67/322 709/224 |
| 2015/0172167 A1* | 6/2015 | Smart | H04L 67/1002 709/226 |

OTHER PUBLICATIONS

Interntational Search Report, PCT/US2010/051720, mailed Nov. 26, 2010.

International Search Report, PTC/US2010/055145, mailed Jan. 10, 2011.

Mockapetris, P., "Domain names—implementation and specification," STD 13, RFC 1035, Nov. 1987.

Written Opinion, PCT/US2010/051720, mailed Nov. 26, 2010.

* cited by examiner

DNS APPLICATION SERVER

RELATED APPLICATION DATA

This application claims benefit of U.S. provisional patent application 61/251,136, filed 13 Oct. 2009, entitled "DNS Application Server," and of U.S. provisional patent application 61/258,042, filed 11 Nov. 2009, entitled "Resource Infrastructure Data Survey," both of which are incorporated herein by reference.

FIELD OF THE INVENTION

The present invention relates generally to data communications and specifically to methods, systems, and computer program products for accessing computer resources.

BACKGROUND

A web client obtains an Internet Protocol (IP) address for accessing an Internet resource (a "resource") by initiating a Domain Name System (DNS) query for a resolution of a Fully Qualified Domain Name (FQDN), or hostname, such as www.example.com. An IP address enables the web client to create an IP connection by which communications with the resource proceeds. Resolution, or translation, of an FQDN to an IP address is described in publication RFC 1035 of the Internet Engineering Task Force (IETF) entitled, "DOMAIN NAMES IMPLEMENTATION AND SPECIFICATION", by P. Mockapetris, as well as in additional IETF publications related to DNS including RFCs 1033, 1034, 1912, 2136, 2181, 2535, 2671, and 4033, the teachings of which are all incorporated herein by reference.

U.S. Pat. No. 7,155,723 to Swildens, et al., whose disclosure is incorporated herein by reference, describes a nameserver that performs resolution based on network information, service probes, latency probes, packet loss probes, bandwidth usage and static latency information.

U.S. Pat. No. 6,996,616 to Leighton, et al., whose disclosure is incorporated herein by reference, describes a map maker service that generates a nameserver map based on server performance.

U.S. Pat. No. 6,446,121 to Shah, et al., whose disclosure is incorporated herein by reference, describes a nameserver configured to receive a DNS query, to send a query to each of a plurality of mirror web sites, and to respond to the query by indicating the mirror web site with the best round-trip packet time.

SUMMARY

In accordance with an embodiment of the present invention, a method is provided for providing access to an Internet resource including receiving a DNS query to resolve a hostname, receiving status data, invoking a code by a name indicated by the hostname, conveying the status data to the code, receiving from the code a selection of an infrastructure, and generating a DNS response directing a resolution towards the infrastructure.

In some embodiments directing the resolution towards the infrastructure includes providing a redirection to a hostname alias resolving to the infrastructure, or alternatively, providing a resolution to an IP address of the infrastructure. Typically, the selection received has been determined by the code to be optimal with respect to a function of cost and quality of access.

Conveying the status data may include conveying status data specific to a web client location. In some embodiments, the hostname includes a resource provider indicator and conveying the status data includes conveying status data specific to the resource provider indicator.

Status data may include a measure of infrastructure usage. Alternatively or additionally, the status data may include a measure of access quality. In further embodiments, status data may include a web client location.

Typically, receiving the DNS query includes registering an authorized nameserver to receive the DNS query from a resolver, and generating the DNS response includes conveying the DNS response to the resolver.

The hostname generally includes a domain and a key string, and the name of the code indicated by the hostname is indicated by the key string.

The method typically includes receiving the code, which includes computer-executable instructions. Reception of the code may be performed by means of a web portal.

Invoking the code generally includes executing an instance of the code and queuing a request for the instance of the code.

Invoking the code may include executing the code in a restricted runtime environment.

There is also provided, in accordance with further embodiments of the present invention, a system for providing access to an Internet resource including an application engine, configured with means for receiving a code including computer executable instructions and executing an instance of the code, and a front-end, configured with means for receiving a DNS query including a hostname to be resolved, receiving status data, invoking the instance of the code by a name indicated by the hostname, conveying the status data to the instance of the code, receiving from the instance of the code a selection of an infrastructure, and generating a DNS response directing a resolution towards the infrastructure.

There is also provided, in accordance with further embodiments of the present invention, a computer program product including a computer readable medium, which includes a computer readable program that when executed on a computer causes the computer to receive a DNS query to resolve a hostname, to receive status data, to invoke a code that includes computer executable instructions by a name indicated by the hostname, to convey the status data to the code, to receive from the code a selection of an infrastructure, and to generate a DNS response directing a resolution towards the infrastructure.

The present invention will be more fully understood from the following detailed description of embodiments thereof.

DETAILED DESCRIPTION OF EMBODIMENTS

Figure 1:
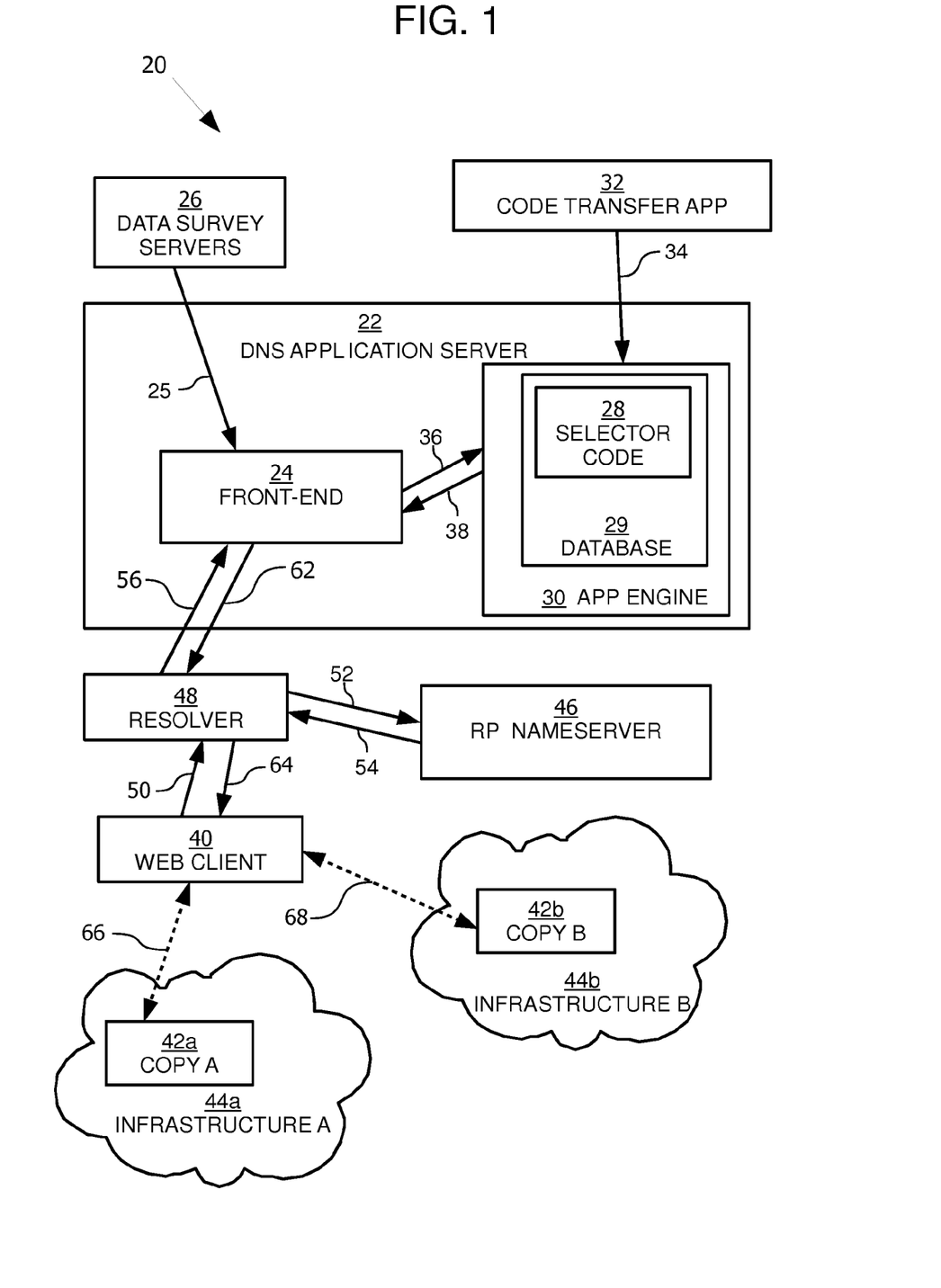
FIG. 1 is a schematic, pictorial illustration of a system for providing access to an Internet resource including a DNS application server, according to an embodiment of the present invention.

FIG. 1 is a schematic, pictorial illustration of a system 20 for providing access to an Internet resource including a DNS application server 22, according to an embodiment of the present invention.

A nameserver may be registered to be authoritative for a domain, such as example.com. Subsequently, DNS queries to resolve hostnames (i.e., subdomains) in the domain are routed to the authoritative nameserver. Hereinbelow, the term "domain" refers to a registered domain name, generally a domain for which an authoritative nameserver is registered. The term "hostname" refers to any domain or subdomain specified in a DNS query.

As described in the abovementioned IETF RFC 1035, a DNS query to resolve a hostname is a DNS message that includes a question section specifying the hostname. A DNS response to the query, issued by an authoritative nameserver, includes a Resource Record (RR) that either resolves the query by specifying an IP address or redirects the query by specifying a redirection, or "hostname alias." A resource record defining a resolution is called an Address Resource Record (A RR). A resource record for redirecting a hostname to a hostname alias is called a Canonical Name Resource Record (CNAME RR).

In embodiments of the present invention, DNS application server 22 includes a front-end 24 configured to perform nameserver functions complying with the abovementioned IETF RFCs, such as receiving DNS queries, generally by User Datagram Protocol (UDP), and providing DNS responses.

Front-end 24 is also configured to receive data feeds 25 from data survey servers 26 and to invoke a selector code 28. Data survey servers may provide real-time data sent to the front-end when acquired. In one embodiment, a data feed is a one-way, encrypted TCP transmission to a Secure Shell (SSH) session. Data feeds may be provided by a data survey server such as that disclosed by the inventor in abovementioned U.S. provisional patent application 61/258,042. Data feeds 25 generally include status data, described further hereinbelow.

Selector code 28 is a computer executable code. Invoking selector code 28 may include executing the selector code, in other words, initiating an executing instance, or object, of the code, or connecting or otherwise communicating with such an instance. It is to be understood that references made hereinbelow to the performance of tasks by selector code 28, such as receiving a request, are made with respect to a running instance of the selector code.

DNS application server 22 may also include application engine 30, a process that may provide a runtime framework for one or more instances of selector code 28. In some embodiments, the application engine includes a loading program that may run an instance of the selector code as an independent process or within a process such as a fastCGI process. Application engine 30 may run selector code 28 in a restricted runtime environment, such that the selector code has no access to external resources, and is restricted to obtaining specific input and to providing specific output.

The selector code may be delivered, or uploaded, to a location accessible to the front-end by means of a code transfer application 32 configured to transmit the code over a connection or message 34. Code transfer application 32 may by a File Transfer Protocol (FTP) based application, or any application providing messaging or connection means known in the art. In one embodiment, described further hereinbelow with respect to FIG. 2, DNS application server 22 includes a web portal for receiving selector codes, and code transfer application 32 is a form within a Hypertext Transfer Protocol (HTTP) web page.

A location of the selector code accessible to the front-end may be a file system or database 29. Once uploaded or otherwise stored, selector code 28 is also assigned a name by which it is subsequently invoked by front-end 24. In an exemplary scenario, a name assigned to selector code 28 may be Scode1.

Included with, or subsequent to, the invocation of selector code 28, front-end 24 sends to selector code 28 a selector request 36, which is a message or connection providing a set of status data. Selector request 36 may be conveyed to selector code 28 by means of application engine 30. The request may be sent by a message service, such as Java Message Service (JMS), or by any other synchronous or asynchronous communication means. Status data may be conveyed in a single data structure or in multiple data structures, either within the aforementioned message or connection, or as a set of function parameters or as environmental variables.

Selector requests may be queued by application engine 30 until an instance of a selector code is available. Other methods of concurrent multi-tasking of applications by application servers may also be implemented such that the DNS application server may provide a scalable framework for supporting multiple concurrent DNS queries.

Selector code 28 is generally programmed by a resource provider to select an infrastructure based on cost and performance criteria, described further hereinbelow. Following such processing, selector code conveys to front-end 24 a selector response 38, including therein an infrastructure selection.

A web client 40, as referred to herein, is an application such as a web browser or a Simple Object Access Protocol (SOAP) application that is configured to access Internet resources. Internet resources may include, but are not limited to files, web pages, applications, mail servers and access services or gateways, including gateways for voice and other media. Such resources are often maintained within infrastructures, which may include corporate data centers or outsourced infrastructures, such as cloud computing infrastructures and content delivery networks (CDNs). Resource providers may pay to maintain resources within a particular infrastructure based on measures of various types of usage, such that the cost of providing a resource may change continuously or at frequent intervals, depending on time of day and on levels of peak or aggregate throughput.

In embodiments of the present invention, two or more copies of a resource sought by web client 40 are maintained within two or more infrastructures. In an illustrative scenario, copies 42a and 42b are maintained within respective infrastructures 44a and 44b.

A resource provider registers a nameserver, indicated as a Resource Provider (RP) nameserver 46, to be authoritative for a domain owned by the resource provider, such as example.com. Typically, RP nameserver 46 is a conventional nameserver, configured to generate DNS responses based on Resource Records (RRs) maintained in maps, often referred to as zone files.

Web clients generally seek a resource by specifying a Uniform Resource Locator (URL) including a name of the resource and a hostname. The hostname specified is generally a hostname in a domain owned by the resource provider. In an illustrative scenario, web client 40 seeks a resource such as a database having a name RPdata and located at a hostname within the example.com domain, such as RPhost1.example.com. To gain access to the resource, the web client requests a connection to a URL indicating the hostname and the resource name, i.e., a URL of the form RPhost1.example.com/RPdata.

DNS resolution for web client 40 is provided by resolver 48. Resolver 48 operates according to DNS protocols as described in the abovementioned RFC 1033. The URL request by the web client generates a DNS query 50 to resolver 48, the query being a request to resolve the exemplary hostname RPhost.example.com. Resolver 48 identifies RP nameserver 46 as authoritative for the specified domain, example.com, and sends a query 52 for resolution of RPhost.example.com to the RP nameserver.

RP nameserver 46 is configured with a mapping to redirect the hostname RPhost1.example.com to a hostname alias for which front-end 24 is authoritative. In embodiments of the present invention, front-end 24 is authoritative for a domain that is distinct from the domain owned by the resource provider. For example, in an illustrative scenario, front-end 24 may be authoritative for a domain DNSappserv.net. The hostname alias returned by RP nameserver 46 includes two parts, one the domain for which front-end 24 is authoritative—DNSappserv.net—and the other part being a key string including a name or indicator of the selector code. The key string may also include a tag specifically indicating the resource provider. Additional indicators may also be included in the key string, including parameters that are to be passed to the selector code.

In the exemplary scenario, for a selector code "Scode1" and a resource provider indicator "RP1," a key string may be defined as Scode1-RP1. A corresponding hostname alias, written in a resource record format, may be Scode1-RP1.DNSappserv.net. Indicators included in a key string need not be delimited by characters (such as a dot or hyphen). Indicators may also be encoded.

A DNS response 54 by RP nameserver 46, specifying the hostname alias Scode1-RP1.DNSappserv.net, is returned to the resolver. The resolver determines that front-end 24 is the authoritative nameserver registered to resolve the hostname alias, and issues to front-end 24 a new DNS query 56 for resolution of the hostname alias.

Front-end 24 parses the hostname alias to extract the identifier of selector code 28, that is, "Scode1." Front-end 24 then initiates or invokes selector code 28 by specifying the extracted identifier. Invocation of selector 28 generally includes passing selector request 36 to the selector code.

Selector request 36 includes status data received by front-end 24 as described above. Such status data may include measures of access quality, which may reflect access quality web client 40 may experience in accessing resource copies 42a and 42b. Status data may also include measures of infrastructure usage, which may affect the cost of providing web client 40 with access to the aforementioned resource copies.

In some embodiments, the front-end may also determine an approximate geographic or network location of web client 40 prior to invoking the selector code. DNS query 56 is typically sent by an IP packet including an IP address of the resolver. The front-end may be configured with a mapping, which correlates resolver IP addresses with geographic locations that approximate a web client location. In addition, a network location, such as an Autonomous System (AS), may be derived from a data survey server providing network topology data, such as Border Gateway Protocol (BGP) data.

Front-end 24 may include one or more estimates of web client location in the status data conveyed with the selector request.

Measures of access quality included in the selector request are generally specific to a web client location and to each of one or more infrastructures. Such measures may include: response time (which may be the elapsed time between sending a transmission and receiving a first response, or receiving a complete response, or similar measures, such as the time between requesting a service and having the service performed); connect time (such as a time for an IP connection, an SSL connection, or a connection to a transaction application server), transmission speed (typically measured in bytes/sec), error rates (such as percent of bad bytes or bad packets), connection jitter (a measure of variability in quality, such as variability of transmission speed or error rate), and rate of availability (e.g., rates of completion of connections or services).

Infrastructure usage status data may include statistics on instantaneous burst rates (i.e., instantaneous throughput as measured in bytes/second of resource content transmitted and/or received by an infrastructure) and aggregate usage (i.e., total number of bytes transferred over a given period of time). Infrastructure usage status data may also include number of requests served, number of open connections, transaction rates, threshold margins, total monthly downloads or aggregate processing load.

Front-end 24 may limit the status data received based on the resource provider indicator included in the key string. For example, in the exemplary scenario described herein, status data passed to selector code "Scode1" would be limited to status data related to infrastructures 44a and 44b. In one embodiment, described further hereinbelow with respect to FIG. 2, a resource provider, when uploading a selector code, also specifies a set of status data variables relevant for the code.

Front-end 24 may also limit the status data received based on the web client location, which may range from a given network or city to a country or continent. Access quality experienced by a web client may vary greatly depending on the web client location. Consequently, in responding to a DNS query from a specific web client, relevant measures of access quality are those determined from the same approximate web client location.

Measures of access quality and usage may also be determined by averaging multiple status data measurements.

The selector code, upon receiving selector request 36, performs one or more logical and mathematical operations on the received set of status data, so as to select an infrastructure at which the web client will access the desired resource.

In one embodiment, logic in the selector code determines a preference index, such that an infrastructure having the best (highest or lowest) preference index is selected as being optimal. The preference index may be a function of an optimal trade-off between costs and access quality.

The selector code may include prices (i.e., pricing tariffs) that the resource provider pays for different types of usage for each infrastructure, including burst rate and commit level prices. For example, infrastructures 44a and 44b may be primary and secondary infrastructures, respectively. The resource provider may pay a flat rate per month for usage of the primary infrastructure until a certain contracted commit level of usage has been reached. Usage above the contracted commit level may be billed at a higher rate. Consequently, the selector code may be configured to compare the contracted commit level of the primary infrastructure with an aggregate usage measure included in the status data. When the contracted commit level has been reached, the selector code may select the secondary infrastructure instead of the primary.

Similarly, if pricing for the primary infrastructure changes for different levels of burst rate, the secondary infrastructure may be preferable, that is, optimal, when a burst rate exceeds a contracted standard level. The selector code may also be programmed to select the secondary infrastructure only on the further condition that one or more real-time measures of access quality of the secondary infrastructure meet minimum criteria.

It may therefore be understood that a selector code may be programmed to optimize access quality and infrastructure cost, where achieving such an optimization may include balancing a trade-off between the two goals.

Implementation of the selector code need not be limited to a specific programming language or programming paradigm. In one embodiment, selector codes are programmed in the general purpose scripting language PHP. The application engine may be a PHP interpreter, or may compile the scripted selector code for execution without an interpreter.

In an example selector program of Appendix 1, a preference index is calculated for each infrastructure by multiplying a cost factor of the infrastructure by a response time for the infrastructure, the response time being included in the status data.

The selector code generates output 38 including a new hostname alias, which is a hostname resolving to one of infrastructures 44a and 44b. For example, a hostname resolving to infrastructure 44a might be RPhost1.cd1.net, and to infrastructure 44b might be RPhost1.cd2.net. In alternative embodiments, selector code 28 may return an IP address directed to one of the infrastructures, thus bypassing the need for subsequent resolution.

Front-end 24 communicates a DNS response 62 to resolver 48. The DNS response directs a resolution towards the selected infrastructure, either by specifying a redirection to the new hostname alias (in a CNAME resource record), or by providing a resolution with the IP address. DNS response 62 may alternatively indicate an error, or other default response, in the event that the selector code does not provide a proper response, or if, for example, no selector code exists having a name indicated by the key string.

When a redirection is specified by DNS response 62, resolver 48 subsequently issues a further query and receives a resolution from a nameserver that is authoritative for the selected infrastructure (not shown). Resolver 48 then returns a resolution DNS response 64 to web client 40.

Upon receiving the resolution, web client 40 may access the desired resource, either by a connection 66 to infrastructure 44a, or by a connection 68 to infrastructure 44b, depending on which of the two respective infrastructures is selected.

Output by selector code 28 may be in the form of a resource record, such that a redirection hostname is specified as a CNAME record and an IP address is specified as an A record. Selector code 28 may also communicate additional parameters to the front-end that may be included in DNS response 62, such as a DNS Time-to-Live (TTL) value. Larger TTL values increase the time a response is cached by the resolver, thereby reducing the load on DNS application server 22.

Typically, front-end 24 invokes selector code 28 from among several selector codes that are accessible to the DNS application server. Selection of a selector code according to the key string allows the DNS application server to support multiple selector codes from one or more resource providers. Implementing a selector code may require only two steps: adding to the resource record table of the RP nameserver a redirection mapping (such mapping including a key string naming the selector code) and uploading the selector code to a location accessible to the front-end.

More than one selector code may be stored in selector code database 29, such that the DNS application server may support distinct selection logic for multiple resources and for multiple resource providers.

Figure 2:
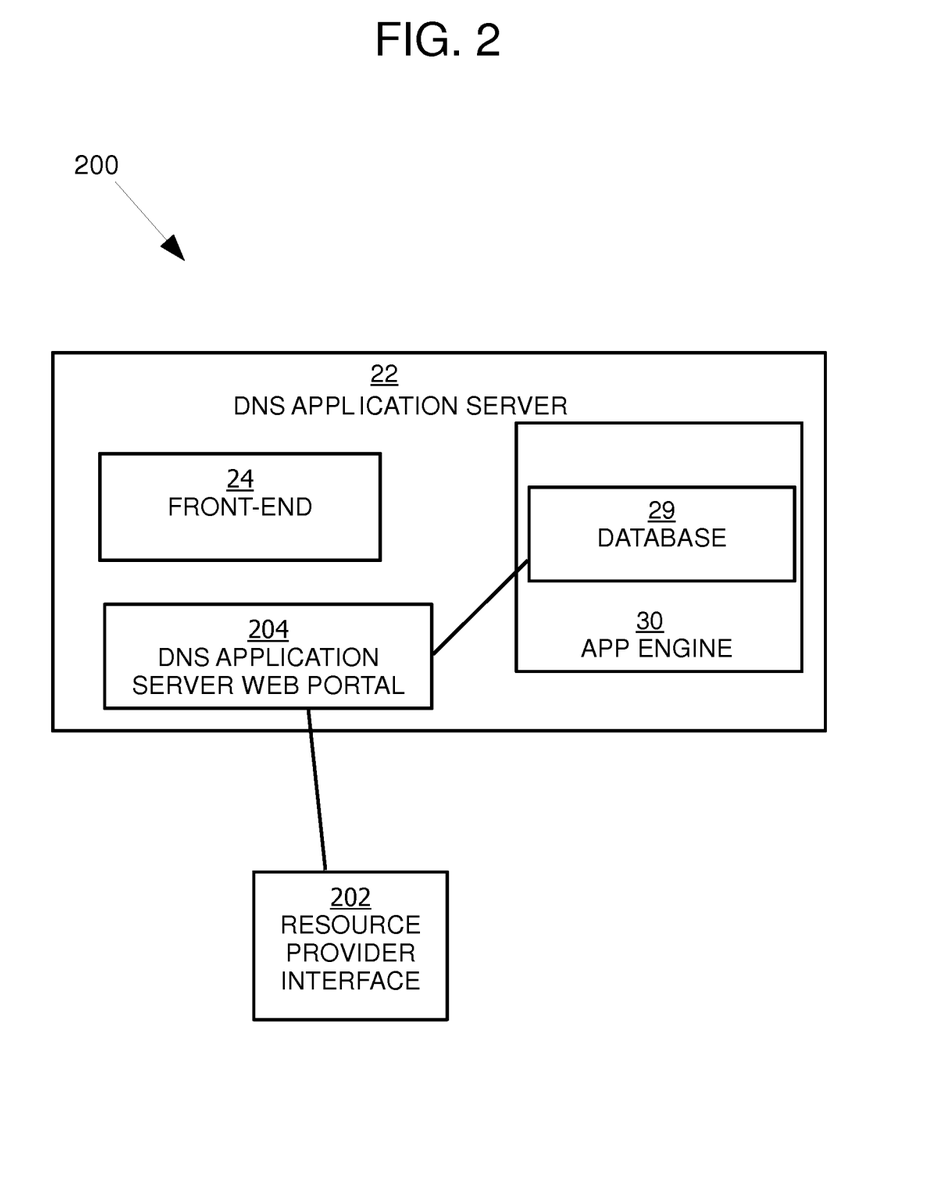
FIG. 2 is a schematic, pictorial illustration of a system for configuring a selector code, according to an embodiment of the present invention.

FIG. 2 is a schematic, pictorial illustration of a system 200 for configuring a selector code, such as selector code 28 described above, for operation by DNS application server 22, according to an embodiment of the present invention.

In an embodiment of the present invention described above with respect to FIG. 1, a selector code is placed at a location accessible to the DNS application server by means of a code transfer application. As shown with respect to system 200, such a code transfer application may be a resource provider interface 202.

Resource provider interface 202 may be a web browser or other Internet-connected application. Content that drives interface 202 may be served by a DNS application server web portal 204. Interface 202 may include a form, into which a resource provider, or other user of the interface, may upload or attach a selector code. The interface may also include additional options, such as text boxes or check boxes, by means of which a user may specify a set of relevant status data variables, thereby providing a correlation, as described above, between the relevant status data and a resource provider indicator.

The DNS application server web portal may allow multiple resource providers, each with its own security code or password, to upload, edit, and delete selector codes.

The selector code may be made available, i.e., accessible, to the DNS application server by several means known in the art, such as being placed in database 29 described above. Database 29 may be a distributed database operating over multiple computers.

Figure 3:
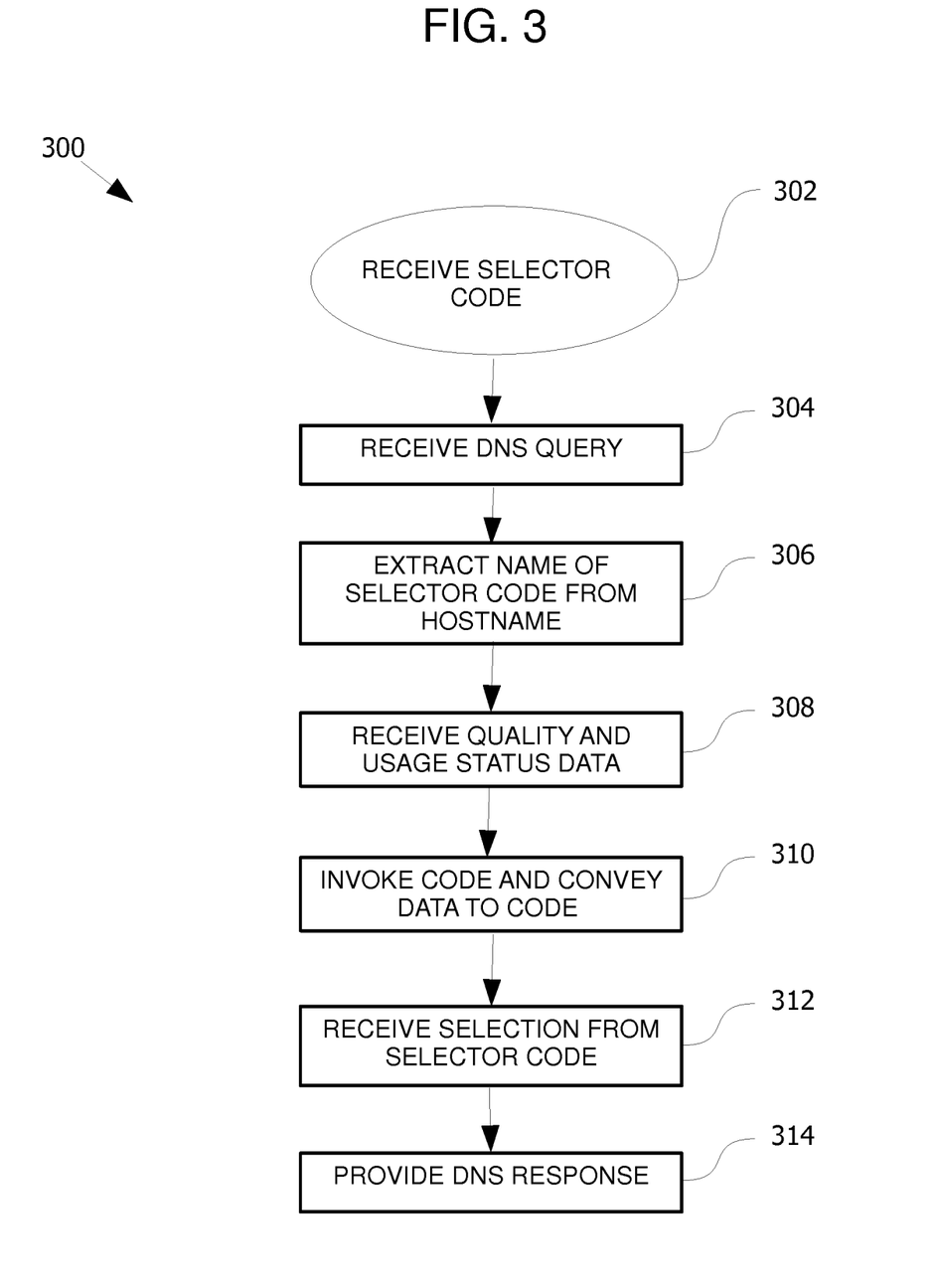
FIG. 3 is a flow diagram of a process for providing access to an Internet resource, according to an embodiment of the present invention.

FIG. 3 is a flow diagram of a process 300 for providing a web client with access to an Internet resource, according to an embodiment of the present invention.

At a step 302, a DNS application server receives a selector code, which may be transmitted to the DNS application server by a resource provider as described above with respect to FIG. 2. The DNS application server may implement scalable, restricted, runtime frameworks for operating the selector code, as described above with respect to application engine 30.

At a step 304, the DNS application server, which includes a front-end configured as an authoritative nameserver, as described above, receives a DNS query. The DNS query is typically initiated by a web client and is transmitted via a resolver.

At a step 306, the DNS application server extracts a key string from the DNS query, thereby obtaining a name indicated by the key string, which is the name by which a selector code is invoked.

At a step 308, the DNS application server acquires status data relevant to the query. The relevant status data may be a subset of the status data that the DNS application acquires in real-time from one or more data survey servers.

At a subsequent step 310, the application server invokes the selector code, by the name indicated in the key string, and passes the relevant status data to the selector code with a selector request. In one embodiment, the DNS application server queues the selector request with an application engine configured to run instances of the selector code.

At a step 312, after the selector code has received the communication of the selector request and determined a hostname redirection or IP address resolution, the DNS application server receives a selector response with a selection of the infrastructure at which the resource is to be accessed.

At a step 314, the DNS application server generates a DNS response to the querying resolver, based on the selected infrastructure provide by the selector code.

When a resource is maintained at an infrastructure, particularly an outsourced infrastructure, a DNS query by a web client to resolve a hostname is typically redirected to a hostname alias indicating (i.e., subsequently resolving to) the outsourced infrastructure. A provider of an outsourced infrastructure may require such redirection, such that subsequent resolution is made by an authoritative nameserver that is configured by the outsourced infrastructure provider.

Generally, the DNS application server of the present invention may be implemented on software and/or hardware. An embodiment as a software program product may be implemented as one or more applications on a general-purpose computing system.

A computing system configured to implement the DNS application server may have one or more processors and one or more network interface modules. Processors may be configured as a multi-processing or distributed processing system. The network interface modules control the sending and receiving of data packets over networks.

Such a computing system also includes memory storage for storing computer executable instructions that instruct the processors to perform various operations described herein. Memory storage may also include multiple distributed memory units, including one or more types of storage media. Examples of storage media include, but are not limited to, magnetic media, optical media, and integrated circuits such as read-only memory devices (ROM) and random access memory (RAM).

It is to be understood that the embodiments described hereinabove are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

---
APPENDIX
Sample Selector code

---

```
<?php /* * Sample App : Optimize for Cost * Description: Use
CDN response times and per-CDN costs to select most cost-
effective CDN provider */
function process_request($request,$radar) {
/* * $request provides all of the request parameters
* provided by the user. $radar provides an array of CDN
* response times relevant to the requester. */
// Set the return URLs to use depending on the provider
$address["edgecast"] = "wac.13BE.edgecastcdn.net,edgecast";
$address["cdnetworks"] = "n1.panthercdn.com,cdnetworks";
$address ["yacast"] = "http5.mhvcdn.yacast.net,yacast";
// Set provider costs selected. $cost["edgecast"] = 21;
$cost["cdnetworks"] = 20;
$cost["yacast"] = 20;
// Sort the response times from low to high.
asort($radar["http_rtt"]);
// Sort the costs from low to high. asort($cost);
// Select from among the address that we have performance
data $availableAddrs = array_intersect_key($address,
$radar["http_rtt"]);
// Next select from the addresses that we have price data
for $pricedAddrs = array_intersect_key( $cost,
$availableAddrs);
```

---
APPENDIX
Sample Selector code

---

```
//rank the remaining addresses from low to high
asort($pricedAddrs);
//initialize selector response $response = " ";
/* For each provider that has price and performance data,
* we will determine the current cost by multiplying the
* cost value of the provider by the response time
* of the provider. This gives us best value provider. */
foreach ($pricedAddrs as $key => $value) { $costed[$key] =
$value * $radar ["http_rtt"][$key]; }
// Sort the list based on the cost/response time value.
asort($costed) ;
// double check that a response address exists, return it
if ($address[key($costed)]) { return
$address[key($costed)]; }
// Otherwise, return the default.
return $default_url; } ?>
```

What is claimed is:

1. A method of directing access to an Internet resource to a preferred infrastructure that hosts a copy of the Internet resource, the method including:
    receiving a DNS query to resolve a hostname;
    identifying a hostname alias mapped to the hostname;
    selecting a program code associated with the hostname alias and invoking the program code, the program code accessing infrastructure status data for two or more infrastructures that operate within their own distinct content delivery networks and selecting an infrastructure of the two or more infrastructures for use in accessing resources associated with the hostname alias;
    receiving from the selected program code an identification of the selected infrastructure, the identification based, at least in part, on the infrastructure status data; and
    responding to the DNS query with a DNS response that directs DNS resolution of the hostname towards the selected infrastructure.

2. The method of claim 1, wherein the program code is implemented according to a predetermined API and received from a third party other than a provider of the API.

3. The method of claim 1, wherein the program code is implemented as a PHP script and received from a third party.

4. The method of claim 1, further including receiving a query source location for the DNS query, wherein the program code has access to the infrastructure status data that relates to performance expected for access to the Internet resource originating from the query source location.

5. The method of claim 4, wherein the query source location is an approximate geographic location of a web client.

6. The method of claim 4, wherein the query source location is a network location of a network that hosts a web client.

7. The method of claim 4, wherein the query source location is an Autonomous System network location of an Autonomous System that hosts a web client.

8. The method of claim 1, further including the program code having access to cost information for the two or more infrastructures and receiving a selected infrastructure from among the two or more infrastructures that takes into account the cost information.

9. The method of claim 8, further including the program code having access to periodic infrastructure usage information for the hostname and combining the periodic infrastructure usage information with the cost information to select the selected infrastructure.

10. The method of claim 1, wherein the selected program code is one of a plurality of program codes corresponding to various hostnames supported by various independent content delivery networks.

11. A non-transitory computer readable storage medium storing computer instructions to direct access to an Internet resource to a preferred infrastructure that hosts a copy of the Internet resource, wherein the computer instructions, when executed, cause a device to perform actions including:
   receiving a DNS query to resolve a hostname from a web client;
   identifying a hostname alias mapped to the hostname;
   selecting a program code associated with the hostname alias and invoking the program code, the program code accessing infrastructure status data for two or more infrastructures that operate within their own distinct content delivery networks and selecting an infrastructure of the two or more infrastructures for the web client to use to access resources associated with the hostname alias;
   receiving from the selected program code an identification of the selected infrastructure, the identification based, at least in part, on the infrastructure status data; and
   responding to the DNS query with a DNS response that directs DNS resolution of the hostname towards the selected infrastructure.

12. The storage medium of claim 11, wherein the program instructions implement a predetermined API used by the program code and the program code is received from a third party other than a provider of the predetermined API.

13. The storage medium of claim 11, wherein the program code is a PHP script received from a third party.

14. The storage medium of claim 11, wherein the program code when executed, causes the device to perform further actions including receiving a query source location for the DNS query, wherein the program code has access to the infrastructure status data that relates to performance expected for access to the Internet resource originating from the query source location.

15. The storage medium of claim 11, wherein the program code when executed, causes the device to perform further actions including accessing cost information for the two or more infrastructures and receiving a selected infrastructure that takes into account the cost information.

16. A system including memory, a computer readable storage medium, and a processor coupled to the memory and the computer readable storage medium, wherein the computer readable storage medium stores computer instructions to direct access to an Internet resource to a preferred infrastructure that hosts a copy of the Internet resource, wherein the computer instructions, when executed on the processor, cause the system to perform actions including:
   receiving a DNS query to resolve a hostname from a web client;
   identifying a hostname alias that is mapped to the received hostname;
   selecting a program code associated with the hostname alias and invoking the program code, the program code accessing infrastructure status data for two or more infrastructures that operate within their own distinct content delivery networks and selecting an infrastructure of the two or more infrastructures for the web client to use to access resources associated with the hostname alias;
   receiving from the selected program code an identification of the selected infrastructure, the identification based, at least in part, on the infrastructure status data; and
   responding to the DNS query with a DNS response that directs DNS resolution of the hostname towards the selected infrastructure.

17. The system of claim 16, wherein the program instructions implement a predetermined API used by the program code and the program code is received from a third party other than a provider of the predetermined API.

18. The system of claim 16, wherein the program code is a PHP script received from a third.

19. The system of claim 16, wherein the program code when executed, causes the device to perform further actions including receiving a query source location for the DNS query, wherein the program code has access to the infrastructure status data that relates to performance expected for access to the Internet resource originating from the query source location.

20. The system of claim 16, wherein the program code when executed, causes the device to perform further actions including accessing cost information for the two or more infrastructures and receiving a selected infrastructure that takes into account the cost information.

21. The method of claim 1, further comprising:
   receiving the DNS query at a DNS server;
   identifying a name server associated with the hostname by the DNS server;
   transmitting the hostname from the DNS server to the identified name server;
   identifying the hostname alias mapped to the hostname at the name server;
   transmitting the mapped hostname alias by the name server to the DNS server; and
   transmitting the mapped hostname alias to a DNS application server by the DNS server;
   wherein, the selecting the program code and receiving the identification of the selected infrastructure from the program code are performed by the DNS application server.

22. The system of claim 16, further comprising:
   a DNS resolver server, configured to:
      receive the DNS query to resolve the hostname from the client,
      transmit the received hostname to a nameserver associated with the hostname, and
      receive the hostname alias from the nameserver;
   the nameserver associated with the hostname, configured to:
      receive the hostname from the DNS resolver server,
      identify the hostname alias that is mapped to the received hostname, and
      transmit the mapped hostname alias to the DNS resolver server; and
   a DNS application server, configured to:
      receive the mapped hostname alias from the DNS resolver server,
      perform the selecting of the program code and the receiving of the identification of the selected infrastructure from the selected program code, and
      transmit the identification of the selected infrastructure to the DNS resolver server.

* * * * *